United States Patent [19]

Gallagher, Jr.

[11] Patent Number: 5,236,520
[45] Date of Patent: Aug. 17, 1993

[54] HIGH STRENGTH STEEL SWAY BARS AND METHOD OF MAKING

[75] Inventor: Hugh M. Gallagher, Jr., Cincinnati, Ohio

[73] Assignee: Consolidated Metal Products, Inc., Cincinnati, Ohio

[21] Appl. No.: 848,646

[22] Filed: Mar. 9, 1992

Related U.S. Application Data

[63] Continuation-in-part of Ser. No. 602,675, Oct. 24, 1990, Pat. No. 5,094,698.

[51] Int. Cl.$^5$ ............................................. C21D 7/00
[52] U.S. Cl. ................................. 148/320; 280/689; 72/364; 72/700; 148/599; 148/598
[58] Field of Search ............... 148/320, 598, 599; 72/364, 700; 280/689

[56] References Cited

U.S. PATENT DOCUMENTS

| | | | |
|---|---|---|---|
| 1,862,281 | 6/1932 | Schaefer | 72/356 |
| 2,767,836 | 10/1956 | Nachtman | 148/648 |
| 2,767,837 | 10/1956 | Nachtman | 148/648 |
| 2,880,855 | 4/1959 | Nachtman | 148/636 |
| 2,953,794 | 9/1960 | Klooz | 148/649 |
| 3,066,408 | 12/1962 | Fader | 148/652 |
| 3,076,361 | 2/1963 | Epstein et al. | 148/648 |
| 3,557,587 | 1/1971 | Cardillo | 148/649 |
| 3,573,999 | 4/1971 | Gokyu | 148/590 |
| 3,720,087 | 3/1973 | Gottschlich | 148/648 |
| 3,877,281 | 4/1975 | Shimizu et al. | 72/364 |
| 3,908,431 | 9/1975 | Jones et al. | 72/364 |
| 4,289,548 | 9/1981 | Bucher et al. | 148/320 |
| 4,312,210 | 1/1982 | Nishizana et al. | 148/649 |
| 4,317,355 | 3/1982 | Hatsuno et al. | 72/342 |
| 4,608,851 | 9/1986 | Khare | 72/364 |
| 4,805,437 | 2/1989 | Heil, Jr. et al. | 72/356 |

OTHER PUBLICATIONS

Keyser, Carl A., "Materials Science in Engineering" 2nd Edition pp. 236–237, 1974.

Nehl, E. "Warm extrusion of free-cutting steels—properties of etruded parts" Draht, 35(12), 604–8 1984.

Primary Examiner—Deborah Yee
Attorney, Agent, or Firm—Wood, Herron & Evans

[57] ABSTRACT

Sway bars made of high strength steel having grains with a preferred orientation, and methods of making such sway bars from blanks of high strength steel typically having a yield strength of at least about 90,000 psi and a tensile strength of at least about 120,000 psi.

33 Claims, 1 Drawing Sheet

HIGH STRENGTH STEEL SWAY BARS AND METHOD OF MAKING

RELATED APPLICATION

This application is a continuation-in-part application of U.S. patent application Ser. No. 07/602,675, filed Oct. 24, 1990, now U.S. Pat. No. 5,094,690. This application is assigned to the assignee of this application.

FIELD OF THE INVENTION

The present invention relates to stabilizer or sway bars made of high strength steel and methods of making same. More particularly, the present invention relates to sway bars having a predetermined geometric configuration (i.e., shape) which are made of high strength steel having grains with a preferred orientation or texture. This invention also relates to a method of either cold forming or warm forming a blank of high strength steel into such a sway bar.

BACKGROUND OF THE INVENTION

Sway bars are used to stabilize the body of a motor vehicle or the like. For example, sway bars are used to prevent side sway caused by the inertia of a vehicle, as in going around a curve. In order for it to properly perform this function, it is important that the sway bar be made out of high strength steel having a high modulus of elasticity, i.e., stiffness.

Steel sway bars have heretofore been formed by hot forging steel blanks into the desired shape. Hot forging techniques are well known in the art. In typical hot forging, the steel blank used to make the sway bar is initially heated well above the recrystallization temperature of the steel to about 2,000° F. and higher. While at this temperature, the steel blank is forged into a sway bar. Once the final shape of the sway bar has been obtained, the mechanical properties of the finished sway bar are produced either by subsequent normalizing or a quench and temper procedure, depending on the steel being used and the final mechanical properties desired. Hot forging a steel blank to the final shape produces a steel having grains with a random orientation.

In addition, at the temperature reached during hot forging, substantial scale and decarburization of the steel may occur. Since the scale and decarburized surfaces must be removed to obtain the finished part, some known hot forging techniques result in the waste of a certain amount of material and result in increased costs due to the additional processing steps required to remove the scale. Furthermore, hot forging is costly due to the energy consumed in heating the steel blank to the forging temperature. The manufacturing costs grow even higher when quench and temper steps are performed due to the increased energy consumption during austenitizing and tempering as well as the costs associated with having additional processing steps.

SUMMARY OF THE INVENTION

The present invention is directed to a sway bar made of high strength steel having grains with a preferred orientation or texture. The present invention is also directed to a method of making such sway bars from blanks of high strength steel having yield strengths of at least about 90,000 psi and tensile strengths of at least about 120,000 psi.

Sway bars according to the present invention have steel grains with a preferred orientation at least along a portion or segment of the sway bar. In one form, the steel grains along a substantial length of the bar, or even the entire bar length, have a preferred orientation. It is preferable that this texture be substantially parallel to the longitudinal axis of the sway bar to provide additional strength along the axis.

In one of its aspects, the present invention provides a method of making high strength steel sway bars from blanks of high strength steel by cold forming the blank whereby the yield strength and tensile strength of the sway bar are either substantially the same as or greater than the blank without the need of a subsequent thermal softening process.

The present invention also provides a method of making high strength steel sway bars from such blanks of high strength steel by warm forming the blank to provide a sway bar, whereby the yield strength and tensile strength of the sway bar are substantially the same as or greater than the blank.

The present invention further provides a method of making high strength steel sway bars including either cold forming or warm forming a blank of high strength steel whereby the yield strength and tensile strength of the sway bar are substantially the same as the blank and wherein the sway bar, with the desired yield and tensile strengths, is produced without further strengthening steps.

In another feature of the present invention, a portion or segment of the blank is either cold or warm formed thereby causing the corresponding segment of the resulting sway bar to increase in strength. This additional strength helps to maintain the sway bar in its predetermined geometric configuration. That is, those portions of the sway bar which were formed have an additional strengthening mechanism (i.e., strain hardening) to maintain their shape.

In contrast to known prior sway bars of hot forged steel with random grain structures, the sway bars of this invention are made of high strength steel having grains with a preferred orientation or texture. In further contrast, the inventive method involves making such a high strength steel sway bar from a blank of steel possessing the desired high strength properties. The method includes either cold forming or warm forming the blank into a sway bar whereby the yield strength and tensile strength of the sway bar are substantially the same or greater than those possessed by the blank. According to such methods, the steel blank may retain any preexisting texture and/or have subsequent texturing imparted to it, and the sway bar may be produced without additional processing steps.

The principles of this invention, its objectives and advantages will be further understood with reference to the following detailed description.

DETAILED DESCRIPTION OF THE INVENTION

Figure 1:
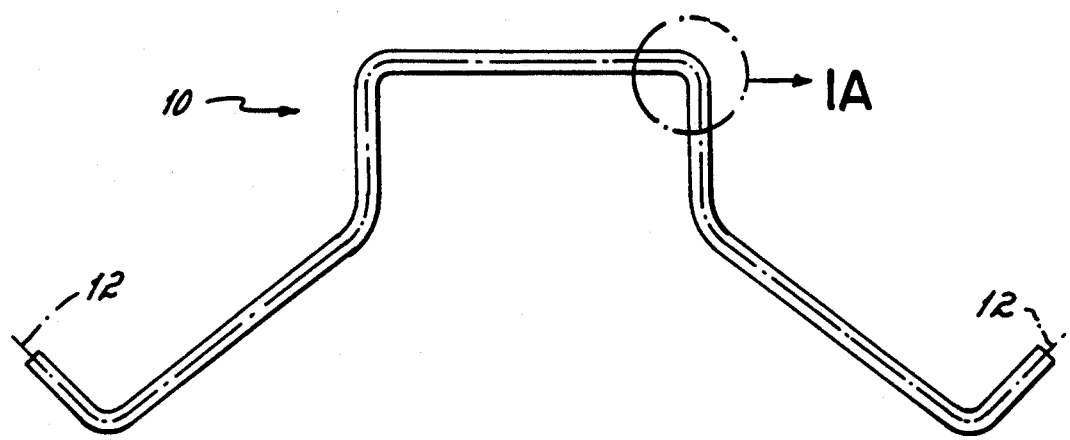
FIG. 1 is a perspective view of a sway bar according to the present invention.
Figure 1A:
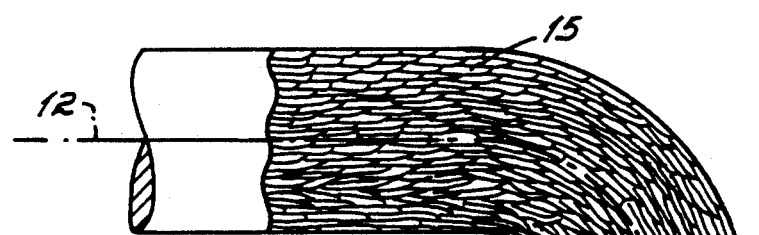
FIG. 1A is an enlarged metallographic view along a longitudinal section of the encircled area of FIG. 1 illustrating steel grains having a preferred orientation.

The present invention relates to sway bars having a wide variety of geometric configurations. One such configuration is illustrated in FIG. 1. Sway bar 10 has a predetermined geometric configuration, as shown, with a longitudinal axis 12. Sway bar 10 is made of high strength steel having steel grains 15 with a preferred orientation or texture. Preferably, the steel grains 15 of sway bar 10 are substantially parallel to the longitudinal axis 12 (see FIG. 1A).

Sway bars according to a preferred embodiment of the present invention are made from blanks of high strength steel having grains with a texture parallel to the longitudinal axis of the blank such that the orientation of these textured grains will be substantially parallel to the resulting sway bar's longitudinal axis after either cold or warm forming. In an alternative embodiment, the sway bars are made from blanks of high strength steel having grains with a random orientation such that only the grains which are deformed during the forming operation (i.e., from blank to sway bar) are textured.

In most preferred forms, sway bars according to the present invention are formed from blanks of high strength steel having a yield strength of at least about 90,000 psi, and preferably at least about 130,000 psi, and a tensile strength of at least about 120,000 psi, and preferably at least about 150,000 psi. Such blanks are then either cold formed at a temperature of less than 300° F. or warm formed within a temperature range from about 300° F. up to about the steel's recrystallization temperature into sway bars with predetermined geometric configurations. Whatever forming temperature is used, detrimental recrystallization should be avoided. Forming (i.e., permanently deforming) the blank at a temperature which avoids complete recrystallization produces a sway bar with steel grains having a preferred orientation or texture. In a preferred embodiment, the method of the present invention for making high strength steel sway bars includes providing a blank of high strength steel having the yield and tensile strength as given above and a preferred orientation which is parallel to the longitudinal axis of the blank.

The temperature at which the sway bar is formed is related to the chemical composition of the steel used. When the blank is cold formed into a sway bar, the high strength steel may be exemplified by the following composition, by weight percent:

| carbon | about 0.30 to about 1% |
| manganese | about 2.0 to about 2.5% |
| vanadium | up to about 0.35% |
| iron | balance. |

In a more preferred form, the high strength steel has the following composition, by weight percent:

| carbon | about 0.50 to about 0.55% |
| manganese | about 2.0 to about 2.5% |
| vanadium | about 0.03 to about 0.15% |
| iron | balance. |

When a warm forming process is used, the high strength steel may be exemplified by the following composition, by weight percent:

| carbon | about 0.30 to about 0.65% |
| manganese | about 0.30 to about 2.5% |
| vanadium | up to about 0.35% |
| iron | balance. |

In a more preferred form, the high strength steel has the following composition, by weight percent:

| carbon | about 0.50 to about 0.55% |
| manganese | about 1.20 to about 1.65% |
| vanadium | about 0.03 to about 0.15% |
| iron | balance. |

In the above compositions, columbium, silicon and aluminum may be substituted in whole or in part for vanadium; however, vanadium is preferred for strength and ductility purposes.

When the blank is cold formed into a sway bar according to the present invention, the yield strength and tensile strength of the sway bar are substantially the same or greater than the blank and no subsequent annealing step is required. When the blank is warm formed or cold formed into a sway bar, the sway bar thus produced needs no further strengthening.

The blank of high strength steel which is used as the starting piece in the method of the present invention is produced by any suitable method known in the art. In one form, the high strength steel of the blank used for making sway bars according to the present invention has been hot reduced and cold drawn to provide the blank with the yield strength and tensile strength stated above as well as grains with a preferred orientation parallel to the longitudinal axis of the blank. An example of such a method is disclosed in U.S. Pat. No. 3,904,445 to the present inventor, and the specification in its entirety is incorporated herein by reference.

The '445 patent discloses a processing sequence to produce a high strength steel bar stock of the type particularly useful for producing threaded fasteners, including U-bolts. In the disclosed process, a steel, having a chemistry falling within certain disclosed ranges, is subjected to a standard hot reducing operation to within 10%-15% of final gauge. The hot reduced bar stock is then cut or severed into individual lengths for rapid air cooling. At this point, the bar stock produced has a fine grain structure between about ASTM No. 5-8, with the grains having a random orientation. Thereafter, the individual lengths of hot reduced bar stock are subjected to a cold forming operation to final gauge. The final step is a controlled stress relieving step to reduce residual stresses built up from the cold finishing. The stress relieving leaves the mechanical properties of the metal relatively unchanged. This stress relieving step comprises heating the lengths of bar stock to between about 500°-850° F. for about one hour, but may or may not be necessary. Thus, such bar stock may be used to form the starting blank of high strength steel for making a sway bar according to the present invention.

Most commercially available steels are polycrystalline (i.e., made of many crystals or grains). Each crystal or grain has metal atoms which are arranged in a pattern which is generally repeated throughout the grain (i.e., crystal structure). The grains of a steel part can have a random orientation, a preferred orientation or a combination of both, depending on a number of factors, including the temperature at which the steel is formed. A steel is hot formed when it is plastically or permanently deformed above its recrystallization temperature. With warm forming, the steel is generally preheated to a temperature below its recrystallization temperature before being permanently deformed. Cold forming is generally performed at about room temperature.

Figure 2:
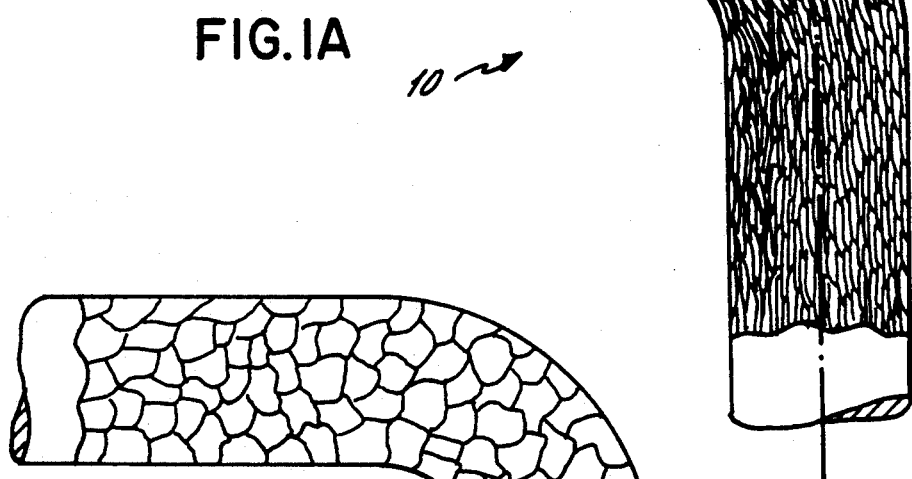
FIG. 2 is an enlarged cross-sectional metallographic view of a comparable segment of a prior art hot forged sway bar illustrating steel grains having a random orientation.

Steel which is hot formed, such as hot forging, has grains 18 with random orientations (see FIG. 2). That is, the orientation of each grain's crystal structure differs from grain to grain. Such a random orientation typically results in the mechanical properties of the steel being isotropic (i.e., the same in all directions). In contrast, cold forming or warm forming a steel causes the crystal structure of the affected steel grains (i.e., those grains which are permanently deformed) to orient themselves according to the way they are deformed (i.e., in a preferred orientation), which generally results in the mechanical properties of at least the deformed portion of the steel being anisotropic in nature. Forming above the recrystallization temperature not only prevents the formation of textured grains but also eliminates any preexisting texturing. Grains which are textured are stronger (i.e., have a higher modulus of elasticity) along the direction of the preferred orientation than grains having a random orientation. For example, cold rolling or extruding a blank of steel bar stock will cause the grains of the steel bar to elongate and reorient themselves into a preferred orientation which is parallel to the longitudinal axis of the bar stock (see FIG. 1A). Such an orientation will result in the bar being strongest along its longitudinal axis. Therefore, a forming operation which either imparts a texture to the high strength steel grains or leaves previously textured grains intact is desirable. Cold or warm forming not only allows preexisting textured grains to be retained, but such treatment may impart additional texturing.

Because cold and warm forming can strengthen the steel at the location of the permanent deformation, even a blank or bar of steel initially having randomly oriented grains can be strengthened by cold or warm forming at the portion or segment which is permanently deformed. Thus, a steel bar or blank, with a random grain orientation, which is permanently bent by cold or warm forming can be stronger along the bend than at any other point along its length. Likewise, a steel bar with grains having a preferred orientation parallel to the bar's longitudinal axis which is permanently bent by cold or warm forming can also be stronger along the bend than at any other point along its length. When the bar is bent, the textured grains of the steel bar also bend, following the longitudinal axis (see FIG. 1A). For any given degree of permanent deformation, however, cold forming has a greater strengthening effect than warm forming.

Warm forming of a high strength steel blank into a sway bar, whereby the yield and tensile strength of the sway bar are substantially the same as the blank was disclosed in my above-identified U.S. application Ser. No. 602,675. This application amplifies and discloses additional aspects of the method of making sway bars.

From the above disclosure of the general principles of the present invention and the preceding detailed description, those skilled in the art will readily comprehend the various modifications to which the present invention is susceptible. Therefore, I desire to be limited only by the scope of the following claims and equivalents thereof.

What I claim is:

1. A sway bar comprising
a bar made of high strength steel having a predetermined length and geometric configuration, with at least one bend wherein the grains of said steel have a preferred orientation at least along a segment of the bar to provide enhanced strength to the bar at said segment.

2. The sway bar of claim 1 wherein said bar has a longitudinal axis and the preferred orientation of said segment is substantially parallel to the longitudinal axis of said bar.

3. The sway bar of claim 1 wherein the steel grains along a substantial length of the bar have a preferred orientation.

4. The sway bar of claim 3 wherein said bar has a longitudinal axis and said preferred orientation is substantially parallel to the longitudinal axis of said bar.

5. The sway bar of claim 1 wherein said preferred grain orientation is along the entire bar length.

6. The sway bar of claim 5 wherein said bar has a longitudinal axis and said preferred orientation is substantially parallel to the longitudinal axis of said bar.

7. The sway bar of claim 1 wherein said segment is formed by permanently deforming a blank of high strength steel at a temperature below the recrystallization temperature of the steel into a predetermined geometric configuration to provide said sway bar having steel grains with the preferred orientation.

8. The sway bar of claim 7 wherein said segment is plastically deformed at a temperature below about 300° F.

9. The sway bar of claim 7 wherein said segment is permanently deformed at a temperature between about 300° F. and below the recrystallization temperature of the steel.

10. The sway bar of claim 1 wherein said high strength steel has a yield strength of at least about 90,000 psi and a tensile strength of at least about 120,000 psi.

11. The sway bar of claim 10 wherein said high strength steel has a yield strength of at least about 130,000 psi and a tensile strength of at least about 150,000 psi.

12. The sway bar of claim 1 wherein the high strength steel comprises, by weight percent:

| carbon | about 0.30 to about 1% |
|---|---|
| manganese | about 0.30 to about 2.5% |
| vanadium | up to about 0.35% |
| iron | balance. |

13. The sway bar of claim 12 wherein the high strength steel comprises, by weight percent:

| carbon | about 0.50 to about 0.55% |
|---|---|
| manganese | about 1.20 to about 1.65% |
| vanadium | about 0.03 to about 0.15% |
| iron | balance. |

14. The sway bar of claim 12 wherein the high strength steel comprises, by weight percent:

| carbon | about 0.30 to about 0.65% |
|---|---|
| manganese | about 2.0 to about 2.5% |
| vanadium | up to about 0.35% |
| iron | balance. |

15. The sway bar of claim 14 wherein the high strength steel comprises, by weight percent:

| | |
|---|---|
| carbon | about 0.50 to about 0.55% |
| manganese | about 2.0 to about 2.5% |
| vanadium | about 0.03 to about 0.15% |
| iron | balance. |

16. A method of making a sway bar from high strength steel comprising the steps of:
   providing a blank of high strength steel having a yield strength and tensile strength; and
   forming a segment of the blank at a temperature to provide a sway bar having a predetermined geometric configuration with at least one bend and having grains with a preferred orientation, whereby the yield strength and tensile strength of the sway bar are substantially the same or greater than the blank.

17. The method of claim 16 wherein the blank is a high strength steel with a yield strength of at least about 90,000 psi and a tensile strength of at least about 120,000 psi.

18. The method of claim 16 wherein the blank of high strength steel has a yield strength of at least about 130,000 psi and a tensile strength of at least about 150,000 psi.

19. The method of claim 16 wherein the high strength steel of the blank has been subjected to hot reducing and cold drawing.

20. The method of claim 16 by cold forming said segment at a temperature of less than about 300° F.

21. The method of claim 20 wherein the blank, used to form a sway bar with said preferred orientation, has at least one segment with steel grains having a preferred orientation.

22. The method of claim 21 wherein the blank has a longitudinal axis and said preferred orientation of the blank is substantially parallel to the longitudinal axis.

23. The method of claim 20 wherein the steel grains of the blank, used to form a sway bar with said preferred orientation, have a random orientation.

24. The method of claim 20 wherein said sway bar has a longitudinal axis and said preferred orientation is substantially parallel to the longitudinal axis of said sway bar.

25. The method of claim 20 wherein the high strength steel comprises, by weight percent:

| | |
|---|---|
| carbon | about 0.30 to about 1% |
| manganese | about 2.0 to about 2.5% |
| vanadium | up to about 0.35% |
| iron | balance. |

26. The method of claim 25 wherein the high strength steel comprises, by weight percent:

| | |
|---|---|
| carbon | about 0.50 to about 0.55% |
| manganese | about 2.0 to about 2.5% |
| vanadium | about 0.03 to about 0.15% |
| iron | balance. |

27. The method of claim 16 by warm forming said segment at a temperature of greater than about 300° F. and below the recrystallization temperature of the steel.

28. The method of claim 27 wherein the blank, used to form a sway bar with said preferred orientation, has at least one segment with steel grains having a preferred orientation.

29. The method of claim 28 wherein the blank has a longitudinal axis and said preferred orientation of the blank is substantially parallel to the longitudinal axis.

30. The method of claim 27 wherein the steel grains of the blank, used to form a sway bar with said preferred orientation, have a random orientation.

31. The method of claim 27 wherein said sway bar has a longitudinal axis and said preferred orientation is substantially parallel to the longitudinal axis of said sway bar.

32. The method of claim 27 wherein the high strength steel comprises, by weight percent:

| | |
|---|---|
| carbon | about 0.30 to about 0.65% |
| manganese | about 0.30 to about 2.5% |
| vanadium | up to about 0.35% |
| iron | balance. |

33. The method of claim 32 wherein the high strength steel comprises, by weight percent:

| | |
|---|---|
| carbon | about 0.50 to about 0.55% |
| manganese | about 1.20 to about 1.65% |
| vanadium | about 0.03 to about 0.15% |
| iron | balance. |

* * * * *